United States Patent [19]

Arens et al.

[11] 4,004,224
[45] Jan. 18, 1977

[54] METHOD FOR FADE CORRECTION OF COMMUNICATION TRANSMISSION OVER DIRECTIONAL RADIO PATHS

[75] Inventors: Walter Arens; Wolfgang Noack, both of Munich, Germany

[73] Assignee: Siemens Aktiengesellschaft, Berlin & Munich, Germany

[22] Filed: Sept. 13, 1973

[21] Appl. No.: 396,854

Related U.S. Application Data

[63] Continuation-in-part of Ser. No. 218,163, Jan. 17, 1972, abandoned.

[52] U.S. Cl. .................................. 325/2; 325/5; 325/56; 325/62; 325/65
[51] Int. Cl.² .................................................. H04B 7/18
[58] Field of Search ............... 325/2, 5, 14, 37, 42, 325/52, 56, 65, 62; 343/225–227, 179

[56] References Cited

UNITED STATES PATENTS

| | | | |
|---|---|---|---|
| 2,912,569 | 11/1959 | Shepherd | 343/227 |
| 3,028,489 | 4/1962 | Chasek | 325/5 |
| 3,315,164 | 4/1967 | Ferguson, Jr. et al. | 325/62 |
| 3,745,464 | 7/1973 | Lee | 325/62 |

*Primary Examiner*—Robert L. Griffin
*Assistant Examiner*—Marc E. Bookbinder
*Attorney, Agent, or Firm*—Hill, Gross, Simpson, Van Santen, Steadman, Chiara & Simpson

[57] ABSTRACT

A method for communication transmission in common channel operation of a directional radio network, in particular a PCM directional network, in which operation of all transmitters of the radio-relay links takes place during fade-free periods at lower power than usual and upon the occurrence of fading in a particular path, automatically increasing the transmitting power in this path, the increase being effected at the remote transmitter over a return or auxiliary channel from the receiver concerned by fading to the associated remote transmitter.

8 Claims, 2 Drawing Figures

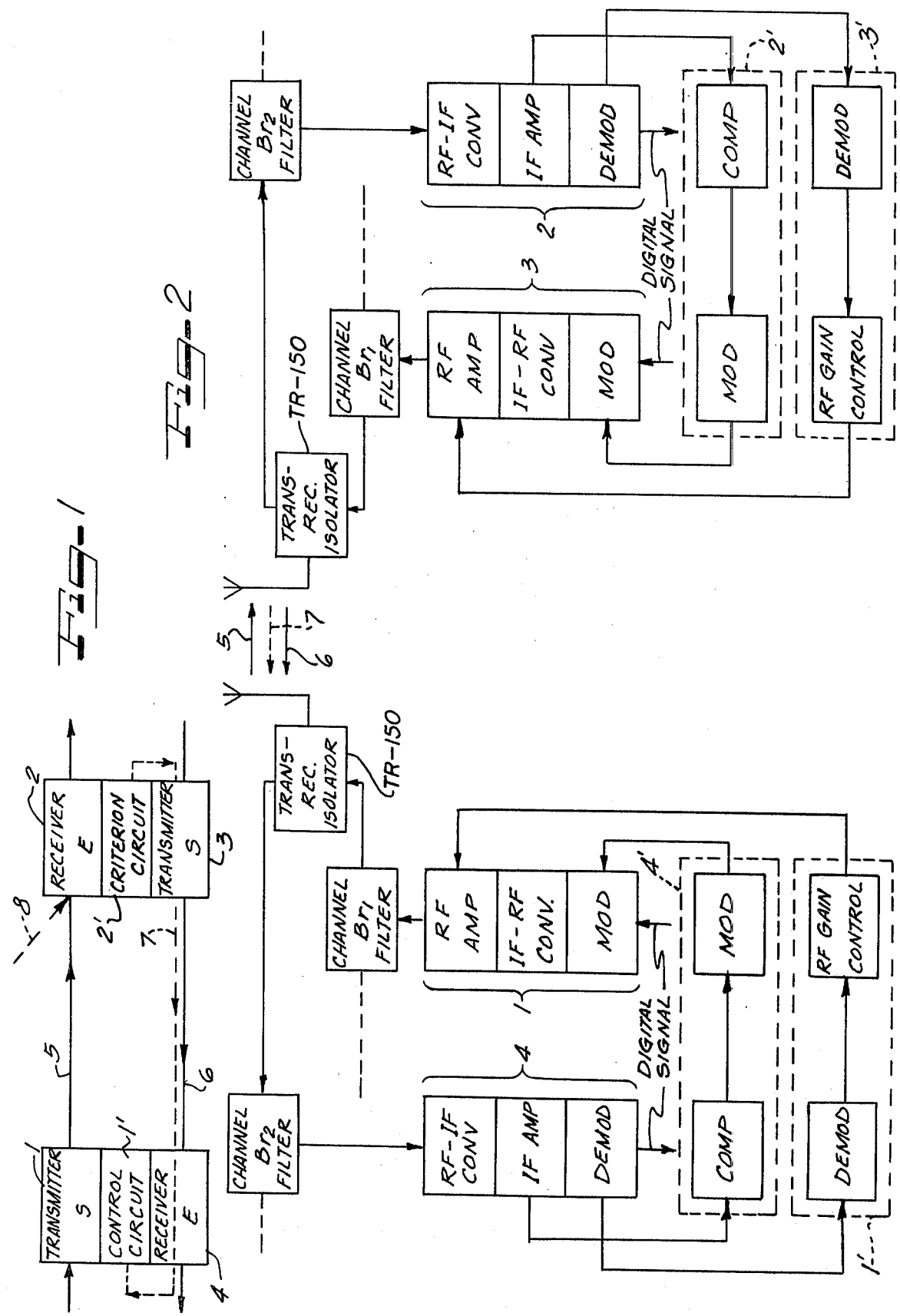

METHOD FOR FADE CORRECTION OF COMMUNICATION TRANSMISSION OVER DIRECTIONAL RADIO PATHS

This is a continuation-in-part of application Ser. No. 218,163, filed Jan. 17, 1972, now abandoned.

BACKGROUND OF THE INVENTION

The invention is directed to a method for use in communication transmission over directional radio paths, in particular, a radio-relay network.

The term "network" is here used in its accepted sense in the communication field with respect to long-distance telephone dialing networks, etc. although in the present instance common-channel radio operation is involved, i.e. microwave transmission. As is well known in the communication field, a communication network may extend between a plurality of cities, centers or points, each of which is, for example, connected with each of the others of the network. Where telephone lines are involved, each line carries transmission in both directions. However where radio transmission is involved, each line would be replaced by two radio transmissions, each comprising its respective transmitter and receiver whereby one transmitter and receiver is employed for one transmission direction and a similar receiver and transmitter employed for the opposite direction. Consequently as between two such "network points," each point would have a transmitter and a receiver. If one such network point is also connected with a plurality of other points, it would have a receiver and a transmitter for each of such additional points connected therewith, and the respective communication directions or paths from such other points to the common point thus would "meet" thereat, which common point thus can be termed a meeting or "junction" point. Obviously, the communication lines extending in different directions from such a junction point to the other points connected thereto would of necessity diverge from such junction point.

As is well known, so-called "common-channel" operation may be advantageously employed in microwave radio communication networks as the microwaves may be transmitted as a focused beam, with an angle of divergence of about 1° commonly being employed. As these waves travel in a straight line, sight differences are normally involved, generally relay or repeater stations being required, usually about thirty miles apart, in dependence on the height of the antennas. Likewise, such waves are subject to rain attenuation.

In determining the operational parameters of the transmitters of a radio-relay network, one of the principal factors taken into account is the possibility of fading, i.e. the parameters involved are so dimensioned or determined that even if fading should occur, the communication transmission will still be achieved. For example, where the transmission of intelligence is in the form of digital signals, such as pulse-code-modulated signals, transmitted over directional radio systems, a wider frequency band is utilized than with an analog transmission of the same information. This, however, is offset by the advantage of digital transmission with respect to a decreased sensitivity to interferences. Thus, with a pulse-code-modulated transmission, interference such as a radio frequency interference signal or thermic noise will not cause an unpermissible error signal rate when the interference level at the receiver input is 10 to 20 decibels below the useful received signal level. However, if thermic noise and radio frequency interference signals superimpose as in the case of fading, a material greater decoupling is required between the useful signal and the radio frequency interference signal or the system will fail with only a small amount of fading. As a sufficient decoupling is often not achievable, the thermal noise must be reduced to smaller values than would be required in the absence of rf-interferences. This usually is so effected that the transmitters of the directional radio system are operated with a much higher transmitting power that would be required, in fade-free periods, for faultless transmission. Thus in turn results that during common channel operation interferences occur in the network which limit the multiple utilization of a channel (common-channel operation) and thus lower the frequency band utilization.

The present invention thus is directed to the provision of a method for communication transmission over directional radio paths in which, during common-channel operation, interference in the network is avoided to a high degree and at the same time adequate quality of the communication transmission is achieved during periods of fading.

BRIEF DESCRIPTION OF THE INVENTION

The problem is solved in accordance with the invention by the method of operating all transmitters of radio links or of a network, as long as no fading exists, with relatively low transmission power, and in the event of fading the power of the transmitters of the path concerned by fading is automatically increased over a feedback control loop.

Where the transmission involved utilizes pulse-code-modulation, the transmission power, during fade-free conditions preferably is so adjusted that the bit error rate due to receiver noise and common-channel interference is acceptable, while in the presence of fading, the transmission power is correspondingly increased whereby the received field strength at the receiver remains constant as long as possible. As a result of the utilization of this feature, a common-channel operation with materially less antenna decoupling (about 30 db) can be tolerated at network cross points that would otherwise be necessary with full transmission power (about 50 db).

When fading on a directional radio path becomes noticeable at the receiver by a reduction in the received field strength, the transmission power of the remote transmitter preferably is so increased that the increased field strength remains constant as long as possible. The delay in automatic gain control which results from the path transit time of the individual path and the return path involved in the transmission of the gain control criterion, (on the order of 1 millisecond) does not have a disturbing effect since fading such as that resulting from rain and multipath propagation typically lasts for a time greater than the total path transit time.

The invention thus enables the utilization of a low power level in all transmitters of the whole network for a high percentage of the operational time involved, so that the danger of interference in the entire network is materially lowered. Noticeable interference, for instance, occurs only when strong fading occurs simultaneously on the interfering and on the interfered paths, which is quite unlikely.

BRIEF DESCRIPTION OF THE DRAWINGS

In the drawings, wherein like reference characters indicate like or corresponding parts:

FIG. 1 illustrates diagrammatically, in block form the broad concept of the invention; and FIG. 2 illustrates diagrammatically, in block form, the system of FIG. 1 but in greater detail.

DETAILED DESCRIPTION OF THE INVENTION

Referring to the drawings, and particularly to FIG. 1, the reference numeral 1 designates a transmitter including a control circuit 1' which is suitably constructed to provide a desired control of at least one transmission parameter. The transmitter 1 is operatively coupled to the receiver 2 over a directional transmission path 5. The receiver 2 is also illustrated as connected to a criterion circuit which, for example, may be constructed to monitor the field strength of the signal received over the path 5 and to develop a control criterion or signal in the presence of a field strength below a predetermined value. In like manner, the transmitter 3 is adapted to transmit over a directional transmission path 6 to the receiver 4, and this oppositely directed system comprising transmitter 3, receiver 4 and path 6 may include like control and criterion circuits (not illustrated).

As illustrated, the criterion circuit 2' of the receiver 2 is operatively coupled to the control circuit 1' of the transmitter 1 over an auxiliary channel 7 of the transmitter 3 and receiver 4, as indicated by the associated broken line, thus forming a feedback control loop. In periods free of fading the transmitters 1 and 3 may be operated at relatively low transmission power. However, if fading occurs on the path 5, becoming noticeable by a lowering of the received signal level in the receiver 2, the transmission power of the transmitter 1 may be thereby increased, in response to control signals transmitted over the auxiliary channel 7, until the received level at the receiver 2 has reached its original value. In the same manner, the transmitter 3 in the opposite direction can be adjusted in dependence upon the received level at the receiver 4, utilizing similar control and criterion determining circuits as well as an auxiliary channel operating in the opposite direction. It will be appreciated that with this arrangement, even in the presence of fading, an interference signal, such as represented by the broken line 8 can be suppressed, as long as the interference level at the receiver input is 10 to 20 db below the level of the received communication signals.

Referring to FIG. 2, which illustrates the general system of FIG. 1 as a phase shift keying (psk) system for digital transmission, but in greater detail, each of the transmitters 1 and 3 include a psk modulator operatively connected to an RF amplifier by an IF-RF conversion section. The output of the RF amplifier is operatively connected to the transmit-receive antenna over a transmit-receive isolation circuit designated TR-ISO, and if additional channels are involved, the transmitter 1 may be operatively isolated from the transmitters of additional channels by suitable means such as a channel filter, designated Br1. The transmitter 3 is similarly constructed and similarly connected over a corresponding filter and isolator to the associated transmitting-receiving antenna.

The receivers 2 and 4 are likewise similarly constructed, each comprising a psk demodulator operatively connected to an RF-IF conversion section by an IF amplifier, with the RF-IF conversion section being operatively connected to receive signals from the associated antenna over the isolator TR-ISO and if other channels are involved over suitable means such as a channel filter, designated Br2.

Thus the digital signals to be transmitted are supplied to the modulator of the associated transmitter, which modulates the digital modulation signal onto an intermediate frequency carrier which is subsequently converted in the IF-RF conversion section, amplified in the high frequency RF amplifier and conducted over the associated channel filter and antenna isolator to the antenna for transmission. In similar manner, the input of the RF-IF conversion section of each receiver is operatively connected to the associated antenna, with the received signal being amplified in the associated IF amplifier and demodulated in the associated demodulator, with the digital signals appearing at the output of such demodulator.

The control circuit 1', operatively connecting the transmitter 1 and the receiver 4, in the embodiment illustrated comprises a control signal demodulator, which is operatively connected to an RF amplifier gain control means, the output of which is operatively connected to the RF amplifier of the transmitter 1, for controlling the transmission power thereof.

In like manner the control circuit 3' for the transmitter 3 includes a similar control signal demodulator, connected to the demodulator of the receiver 2 and an RF amplifier gain control circuit connected to the RF amplifier of the transmitter 3.

The criterion circuit 2' includes a fading control comparator operatively connected to the IF amplifier of the receiver 2 and a control signal modulator which is operatively connected to the modulator of the transmitter 3. In like manner the criterion circuit 4' includes a fading control comparator operatively connected to the IF amplifier of the receiver 4 and a control modulator operatively connected to the modulator of the transmitter 1.

In operation, assuming that transmission is from transmitter 1 to receiver 2, the fading control comparator at such receiver is operative, upon the occurrence of fading, to create a control signal which is then conducted over the control signal modulator, independent of the digital modulation signal, to the modulator of the transmitter 3, i.e. the transmitter at the same location at which the control signal was formed. In the fading control comparator of the criterion circuit 2' the automatic gain control (agc) voltage available at the IF amplifier in the conventional receiver 2 is compared to predetermined reference voltages indicating, e.g. path loss variations of ± 10 dB is relative to normal propagation loss. When a fading of 10 dB is exceeded, the upper reference voltage is reached and a control signal is produced effecting an increase of 10 dB in the power of the remote transmitter 1. The agc-control voltage of the receiver 2 is by this means reduced to the normal value.

If the fading is decreasing by 10 dB the lower reference voltage is reached and the power of the remote transmitter restored to normal.

Three different control signals are required, for the idle condition and for exceeding the respective upper and lower reference voltages. The appropriate control signals can be derived from the d.c. voltage in the comparator by a simple logic circuitry with three different code words. The control signal is thus transmitted with the digital modulation signal to the remote receiver 4 where it is demodulated in the associated control signal demodulator 1', with the detected control signal being conducted to the associated RF amplifier gain control means to produce suitable increase in the transmission in the transmitter 1.

The transmission power level can be suitably adjusted in the RF amplifier gain control means of the control circuit 1' by switching the power supply voltage of an Impatt-diode rf-amplifier.

It will be appreciated that in the practice of the invention, there are several other possibilities for transmission of the control signal from the receiver 2 to the remote transmitter 1, e.g. with a preempted channel, such as an auxiliary channel or service channel. As synchronizing signals are suitably transmitted, another possibility is given by using an available unutilized capacity in the synchronizing signal (time intervals between synchronizing signals, i.e. not actually carrying a synchronizing signal) or in a speech channel assigned for this purpose. The transmission power level can alternatively be adjusted by insertion of suitable attenuators by means of pin diode switches.

In the event a network is involved in which rain attenuation is dominant with respect to interference fading, and wherein a plurality of RF channels are operable on the same path, and thus substantially commonly effected, an adjusting criterion from only one receiver may be utilized as a criterion for effecting adjustment of a plurality of transmitters so involved.

It will be appreciated that the present invention thus is effective with respect to all interferences involved in transmission, of the type here involved, the effects of which may be reduced by a reduction in transmission power. Consequently, for example, a common-channel operation may be effected with decreased antenna side lobe attenuation, allowing smaller angles for diverging routes at junction points. As a result, the frequency-band utilization at all junction points is more favorable to a material degree and if this is not deemed necessary, reduced requirements can be accepted with respect to the side lobe attenuation of the antenna, i.e. utilization of simpler antennas.

In addition, interference from remote transmitters of a PCM directional radio-link network can be reduced permitting an improvement in frequency band utilization as well as facilitating network design. Finally, as a result of the power reduction of the transmitters of such a network, other systems in the same frequency band will be subject to less intereference, facilitating, for example, the coordination FM directional radio and satellite radio operations in the same band.

It will also be appreciated that the adjustment of the power of the transmitters is feasible only within limits since, even in fade-free periods, the signal power at the receiver should be sufficiently above the system threshold and on the other hand a transmitter adjusted to peak power during fading periods must not cause excessive interference to other RF-channels.

It will be appreciated that individual circuits illustrated in block form, for monitoring signal strength, for providing return paths and for controlling transmission power are, per se, known and one skilled in the art well readily be able to practice the present method from the disclosure above set forth.

Having thus described our invention it will be apparent that various immaterial modifications may be made in the same without departing from the spirit of the invention.

We claim as our invention:

1. A method for fade correction in a directional radio network, utilizing common-channel transmission of digital signals, for example pulse code-modulated signals, and having at least one network junction point at which several radio relay systems from diverging transmission directions meet, each of which systems utilize two-way transmission, and thus includes a transmitter and a receiver for each transmission direction, comprising the steps of so adjusting the transmission operation of the transmitters, of such systems, located at such network junction point, during fade-free conditions, that the transmission power in the respective transmission directions is relatively low, with the useful signal level being approximately 10 to 20 db greater than the common channel interference, referred to a receiver input at which the signal involved is received, monitoring the reception of the respective transmissions, and when a transmission from one of the transmitters at said junction point, in any respective transmission direction therefrom, is received with fading, adjusting the transmission power, of the transmitter transmitting the fading signal, to a relatively higher level, and thereafter correspondingly decreasing the transmission power thereof upon cessation of such fading.

2. A method according to claim 1, comprising, in the presence of fading, transmitting a signal indicative thereof from the receiving point of said fading signal to the transmission point from which such fading signal originated, and, in response to such return signal, adjusting the transmission power of the transmitter, originating such fading signal, to a corresponding higher level.

3. A method according to claim 2, wherein the normal transmission between respective transmitters and their cooperable receivers employs a modulated carrier signal, comprising utilizing, for the transmission of such return signals an auxiliary transmission formed by an additional modulation of the signal carrier.

4. A method according to claim 2, wherein the normal transmission between respective transmitters, and their cooperable receivers includes a synchronizing signal, comprising, utilizing for the transmission of said return signal, available unutilized transmission capacity in the synchronizing signal.

5. A method according to claim 2, comprising, utilizing for the transmission of said return signal, a service channel which may or may not belong to the associated system.

6. A method according to claim 2, wherein the network involved is one in which rain attenuation is dominant with respect to fading, and wherein a plurality of RF channels are operable from said point on the same general path, comprising utilizing a return signal from only one receiving point as the basis for effecting adjustment of the transmitters of said plurality of RF channels.

7. A method according to claim 6, comprising utilizing a service channel, which may or may not belong to the associated system, for transmission of such a return signal, and utilizing a return signal from a single receiving point for initiating adjustment of said plurality of transmitters at said network point.

8. A method according to claim 6, wherein the normal transmission between respective transmitters and their cooperable receivers includes a synchronizing, comprising utilizing for the transmission of said return signal, available unutilized transmission capacity in the synchronizing signal.

* * * * *